(12) United States Patent
Garcia et al.

(10) Patent No.: US 6,782,435 B2
(45) Date of Patent: Aug. 24, 2004

(54) DEVICE FOR SPATIALLY AND TEMPORALLY REORDERING FOR DATA BETWEEN A PROCESSOR, MEMORY AND PERIPHERALS

(75) Inventors: Serafin E. Garcia, Folsom, CA (US); Zohar B. Bogin, Folsom, CA (US); Steve Clohset, San Francisco, CA (US); Mikal C. Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 09/816,066

(22) Filed: Mar. 26, 2001

(65) Prior Publication Data

US 2002/0174284 A1 Nov. 21, 2002

(51) Int. Cl.[7] .............................. G06F 7/00; G06F 13/28
(52) U.S. Cl. .............................. 710/33; 710/20; 710/21; 710/31; 710/35; 710/36; 710/40; 710/51; 710/65; 711/151; 711/154; 711/158; 712/225; 712/300; 345/537; 345/538
(58) Field of Search ............................ 710/1, 6, 20, 21, 710/29, 31, 33, 35, 36, 38–41, 43, 51, 52, 58, 62, 65, 72, 244, 306; 711/140, 141, 145, 150, 151, 154, 158, 167, 168, 169; 712/220, 225, 300; 718/100, 102, 103; 345/537, 538

(56) References Cited

U.S. PATENT DOCUMENTS

| | | | |
|---|---|---|---|
| 5,522,050 A | * | 5/1996 | Amini et al. ............... 710/315 |
| 5,526,320 A | * | 6/1996 | Zagar et al. ............. 365/233.5 |
| 5,640,517 A | | 6/1997 | Parks et al. |
| 5,644,788 A | * | 7/1997 | Courtright et al. ............ 710/35 |
| 5,696,917 A | | 12/1997 | Mills et al. |
| 5,715,476 A | | 2/1998 | Kundu et al. |
| 5,784,705 A | | 7/1998 | Leung |
| 5,835,970 A | | 11/1998 | Landry et al. |
| 5,898,857 A | | 4/1999 | Beaman et al. |
| 5,918,072 A | | 6/1999 | Bhattacharya |
| 6,026,465 A | | 2/2000 | Mills et al. |
| 6,178,467 B1 | | 1/2001 | Faucher et al. |
| 6,223,266 B1 | | 4/2001 | Sartore |
| 6,272,600 B1 | * | 8/2001 | Talbot et al. ................ 711/140 |
| 6,363,441 B1 | * | 3/2002 | Bentz et al. .................. 710/58 |
| 6,405,267 B1 | * | 6/2002 | Zhao et al. ................... 710/35 |
| 6,505,259 B1 | | 1/2003 | Garcia et al. |
| 6,665,794 B2 | * | 12/2003 | Koker et al. ................ 712/300 |
| 2003/0070009 A1 | | 4/2003 | Garcia et al. |

* cited by examiner

Primary Examiner—Jeffrey Gaffin
Assistant Examiner—Tanh Q. Nguyen
(74) Attorney, Agent, or Firm—Jeffrey B. Huter

(57) ABSTRACT

A device to spatially and temporally reorder data a processor, memory and peripherals. This device is able to spatially and temporally reorder data for both write and read operations to and from memory, peripherals and a processor. This device uses a peripheral write path spatial reordering unit and a peripheral write temporal reordering unit to reorder data transmitted to peripherals and the memory. Further, this device users a peripheral read data path spatial reordering unit to reorder data read from peripheral devices. In addition, a main memory spatial reordering unit is utilized to reorder data read from main memory.

6 Claims, 5 Drawing Sheets

DEVICE FOR SPATIALLY AND TEMPORALLY REORDERING FOR DATA BETWEEN A PROCESSOR, MEMORY AND PERIPHERALS

FIELD

The invention relates to a device to spatially and temporally reorder data transmitted between a processor, memory and peripheral devices. In particular, a simple, efficient and fast device to order data for processor manipulation in linear and critical chunk format taking into consideration temporal and spatial considerations is provided.

BACKGROUND

Microprocessor performance has seen incredible increases over the short history of computers. With this increase in processor performance, seen in the increased number of processor cycles per second, has come the need for a comparable increase in access speed to data and instructions. Otherwise, it provides little benefit to have a very fast processor if it is spending most of its time waiting for retrieval of data and instructions from memory. One method used to improve access speed to data and instructions is using cache memory which cycles at the same speed as the processor. However, cache memory is expensive and the amount available to a processor is thus limited. Therefore, a need exists to facilitate memory access to data and instructions.

In order to overcome this problem, computer manufactures have employed separate devices or chips to handle memory addressing, access, transfer, and retrieval when requested by a processor or other device. The use of these devices has improved performance since they are specifically designed to handle only memory access, but all too often they have proven to be complex, difficult to implement and still relatively slow. Therefore, in some cases these devices actually form a bottleneck to maximum processor utilization. For example, when a read operation is executed the processor may specify a specific order in which data is to presented to it. Prior methods and devices have often not attempted any reordering of data until all data in a cache line is received. Therefore, a processor will frequently have to wait for arrival of an entire cache line of data before any attempt is made to process the data. Of course, this would slow processing for an otherwise very fast processor. In addition, in prior approaches, when reordering was done it was done on a single cache line basis of 64 bits or less.

Further, processors and other input/output (I/O) devices may have specific requirements as to how data is to be ordered for presentation. Any device that accesses memory at the request of a processor or other I/O device must be able to translate from one form of desired presentation to another while still being able to keep latency and space used on the chip to a minimum and throughput to a maximum without unduly increasing the complexity of the logic required.

Therefore, what is needed is a device to transmit and receive data between a processor, memory and peripherals that can handle temporal and spatial reordering of data in a quick, efficient, simple manner that minimizes the logic and space required on a chipset. This device should be able to simultaneously manipulate as much data as possible to maximize processor efficiency and do so for both read and write operations. Using this method and device the space and power in the chipset as well as the heat generated is reduced while improving processor performance and throughput.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
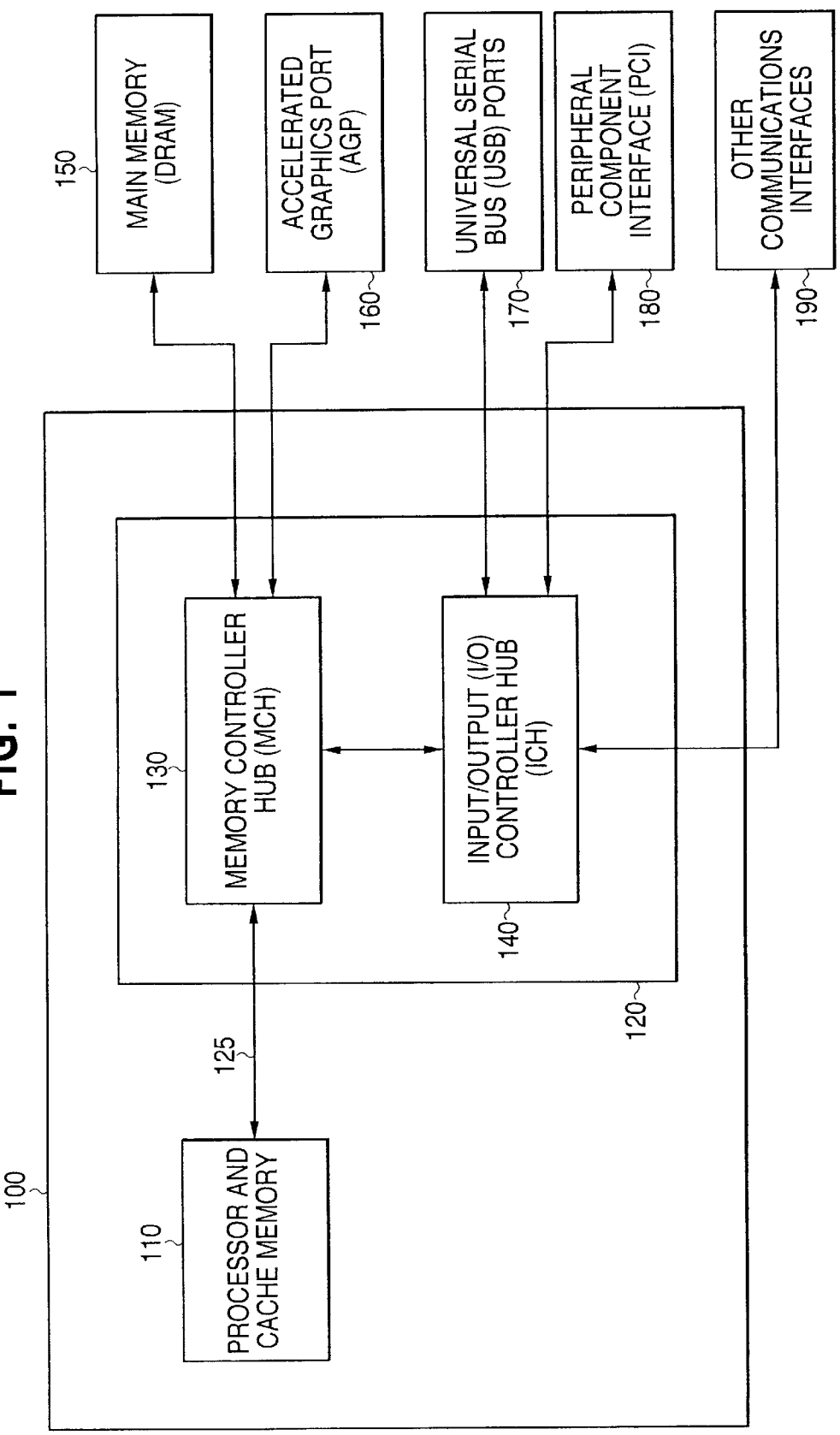
FIG. 1 is an example of an overall system diagram showing a processor interface through a chipset to memory, communications and peripheral devices.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known power connections to integrated circuits and other components may not be shown within the FIGS. for simplicity of illustration and discussion, and so as not to obscure the invention.

FIG. 1 illustrates an example of an embodiment of the present invention in which a baseboard (mother board) 100 may contain a socket for a processor with cache memory 110 and a chipset 120. Within the chipset 120 may be contained a memory controller hub (MCH) 130 and an Input/Output (I/O) controller hub (ICH) 140. The MCH 130 may be used to control access to main memory 150 which may comprises dynamic random access memory (DRAM). The MCH 130 may also control access to an accelerated graphics port (AGP) 160 as well as other comparable devices. The MCH communicates to the processor 110 through the front side bus (FSB) 125. As will be discussed in further detail in reference to table 1 ahead, data is transferred from main memory and peripheral devices through MCH 130 to processor 110 over FSB 125 in two chunks of data where each chunk contains 256 bits of data.

Still referring to FIG. 1, the ICH 140 is utilized to interface to numerous communications devices all of which are not represented in FIG. 1. Provided for exemplary purposes only, the ICH 140 may interface to a universal serial bus (USB) ports 170, a peripheral component interface (PCI) 180 and other communications interfaces 190. Data transmitted by USB ports 170, PCI 180, and other communications interfaces 190 to processor 110 would pass to MCH 130 and then to processor 110 over FSB 125.

Table 1 represents the order in which data is transmitted to processor 110 from MCH 130. This is accomplished by setting cache line start address bits 5 through 3 to a binary value ranging from 000 to 111. As shown in Table 1 ahead, specifying a cache line start address of binary 000 in bits 5 through 3 causes the order of quad word (QW) lanes 0 through 3 of the first chunk of data and QW lanes 0 through 3 of the second chunk of data to be presented in sequential order as they would appear in main memory 150. However, any other cache line start address from binary 001 to 111 will cause that QW lane to appear first and then some predetermined pattern of data as shown in Table 1. The presentation of data to processor 110 in the manner illustrated in Table 1 allows for more efficient processing since the data will be received by processor 110 in the order desired to perform a particular function. However, as previously discussed, until the embodiments of the present invention, the logic required for temporally and spatially ordering of data for both reads and writes was complex and thus consumed substantial space and power in the chipset as well as generating heat.

TABLE 1

| Cache Line Start Address [5:3] (binary) | Logical Address [5:3] (binary) of QW in Given Chunk/Lane | | | | | | | |
|---|---|---|---|---|---|---|---|---|
| | First Chunk | | | | Second Chunk | | | |
| | QW Lane 0 | QW Lane 1 | QW Lane 2 | QW Lane 3 | QW Lane 0 | QW Lane 1 | QW Lane 2 | QW Lane 3 |
| 000 | 000 | 001 | 010 | 011 | 100 | 101 | 110 | 111 |
| 001 | 001 | 000 | 011 | 010 | 101 | 100 | 111 | 110 |
| 010 | 010 | 011 | 000 | 001 | 110 | 111 | 100 | 101 |
| 011 | 011 | 010 | 001 | 000 | 111 | 110 | 101 | 100 |
| 100 | 100 | 101 | 110 | 111 | 000 | 001 | 010 | 011 |
| 101 | 101 | 100 | 111 | 110 | 001 | 000 | 011 | 010 |
| 110 | 110 | 111 | 100 | 101 | 010 | 011 | 000 | 001 |
| 111 | 111 | 110 | 101 | 100 | 011 | 010 | 001 | 000 |

Figure 2:
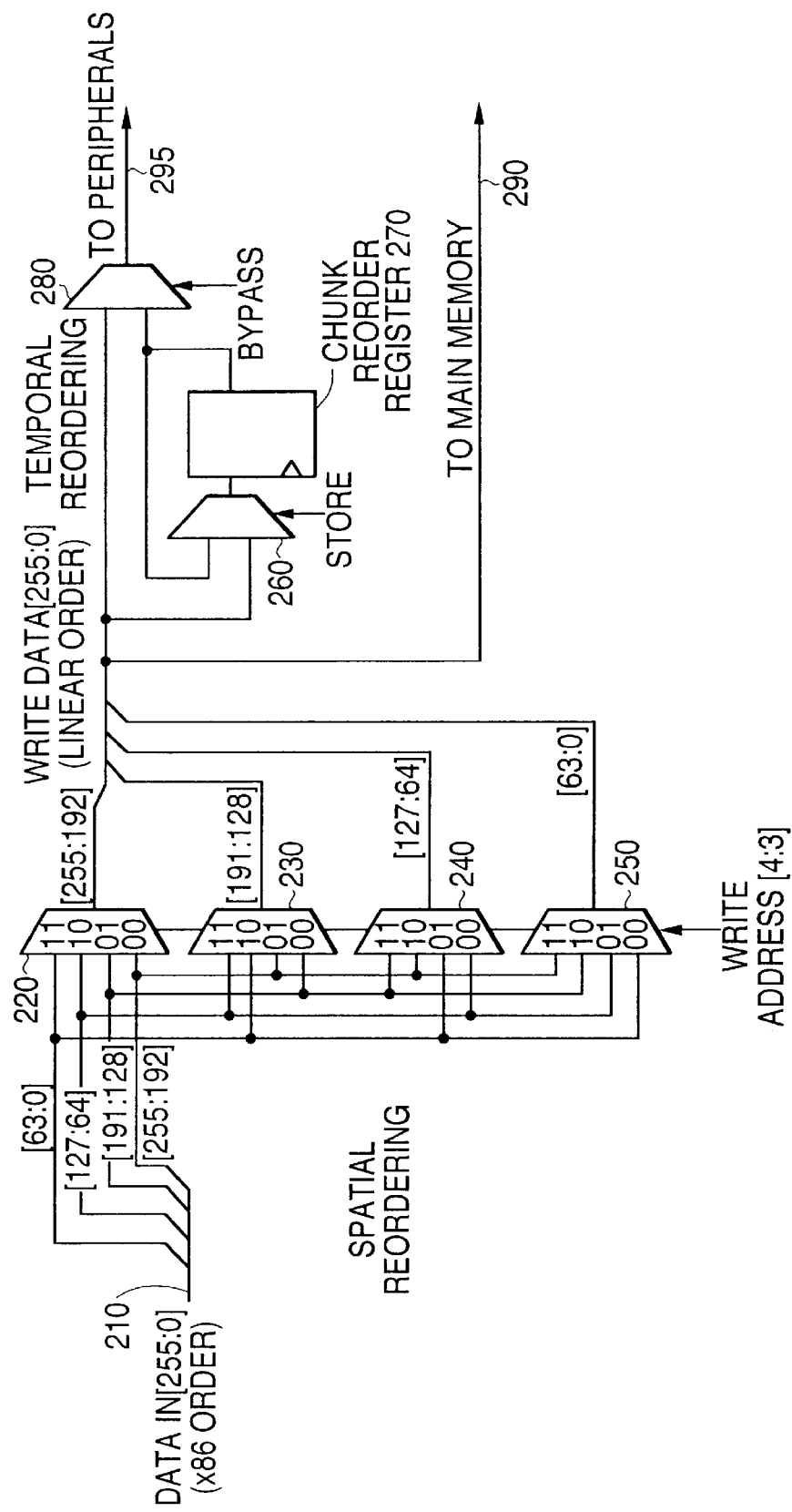
FIG. 2 is a diagram of the write data path spatial/temporal reordering module having components and logic employed in an example embodiment of the present invention.

FIG. 2 is a diagram of the write data path of the spatial/temporal reordering module having components and logic employed in an example embodiment of the present invention. Processor 110 would transmit a first and second chunk of data, as shown in table 1, comprising 256 bits to the temporal reordering module over data in signal 210, shown in FIG. 2. Data in signal 210 would divide the 256 bits of data into four separate segments or signals of 64 bits each in which bits 63 through 0 would form a first segment, bits 127 through 64 would form the second segment, bits 191 through 128 would form the third segment, and bits 255 through 192 would form the fourth segment. Each 64-bit segment or signal would be transmitted to multiplexer 220, multiplexer 230, multiplexer 240, and multiplexer 250. Dependent on bits 4 and 3 of the write address provided by processor 110, the appropriate multiplexer 220, 230, 240, and 250 would be selected to receive and transmit the appropriate 64 bits and based on the bits 4 and 3 spatial reordering would be accomplished. The combination of multiplexers 220, 230, 240 and 250 comprise a peripheral write path spatial reordering unit. For example, as indicated in FIG. 2, if bits 4 and 3 of the write address are set to 11, then bits 63 through 0 from data in signal 210 become bits 255 through 192 using multiplexer 220. Further, bits 127 through 64 from data signal in 210 become bits 191 through 128 via multiplexer 230. Still further, bits 191 through bits 128 from data in signal 210 become bits 127 through 64 using multiplexer 240. Finally, bits 255 through 192 of data in signal 210 become bits 63 through 0 using multiplexer 250. The resulting 256 bits of write data are transmitted to main memory 150 via link 290 and peripheral devices USB ports 170, PCI 180, and other communications interfaces 190 via multiplexer 280 and the link 295.

Still referring to FIG. 2, as would be appreciated by one of ordinary skill in the art the order of the data and very according to bits 4 and 3 of the write address specified as shown in FIG. 2. It should also be noted that a chunk reorder register 270 is provided for storage of information transmitted through multiplexer's 220, 230, 240, and 250. Storage of data from multiplexers 220 through 250 is determined by multiplexer 260 based upon a store signal transmitted to multiplexer 260. In addition, a multiplexer 280 is provided to select between input from chunk reorder register 270 or multiplexers 220 through 250 based upon a bypass signal provided to multiplexer 280. By utilizing multiplexer 260, chunk reorder register 270, and multiplexer 280 it is possible to reorder data by a temporarily storing a chunk of data in chunk reorder register 270 and allowing another chunk of data to be directly pass to multiplexer 280. Thus, where appropriate a piece of data may be held temporarily while a subsequent piece of data is allowed to pass through to a peripheral and thereby arriving to the peripheral first. Thus, multiplexer 260, chunk reorder register 270 and multiplexer 280 form a peripheral write temporal reordering unit. Thereafter, link 295 connected to multiplexer 280 is used to transmit data to peripherals including AGP 160, USB ports 170, PCI 180, and other communications interfaces 190, as shown in FIG. 1.

Figure 3:
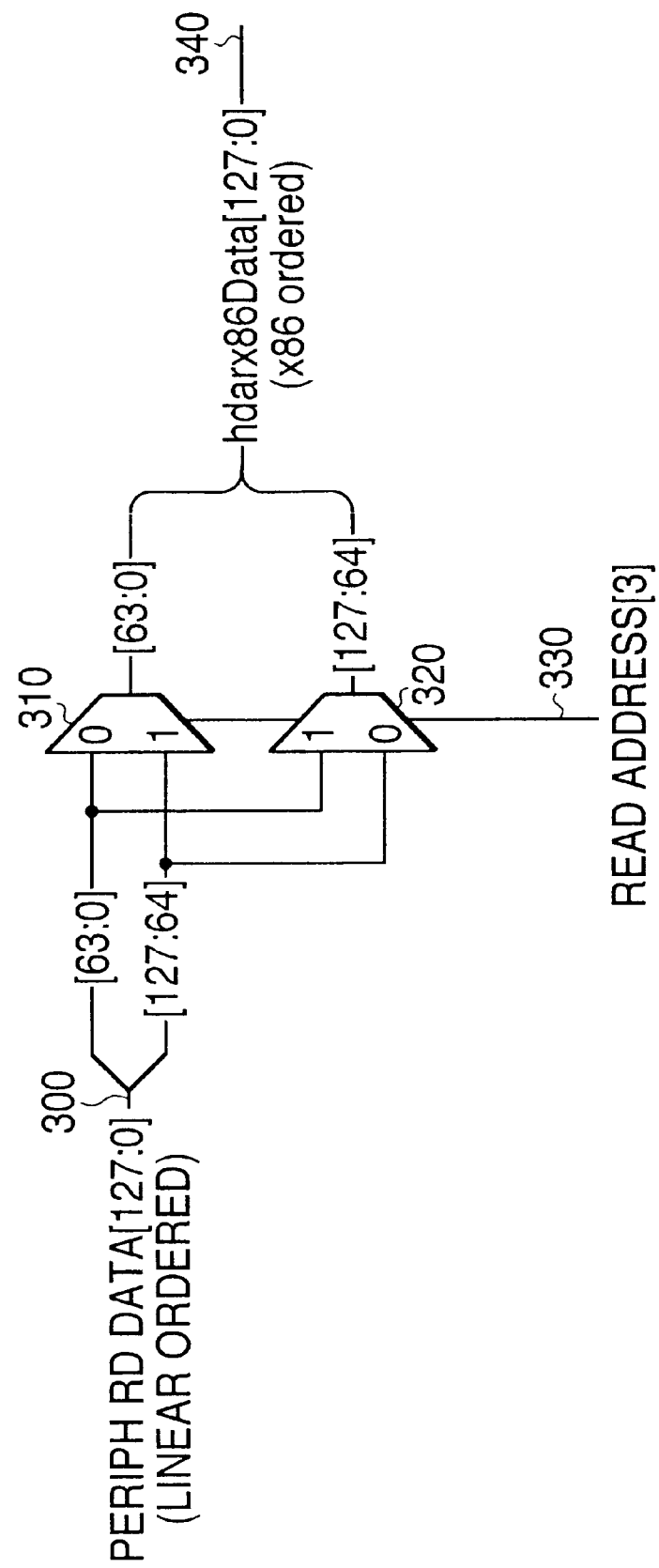
FIG. 3 is a diagram of the peripheral read data path components and logic for octal word spatial reordering module employed in an example embodiment of the present invention.

FIG. 3 is a diagram of the peripheral read data path components and logic for octal word (Octword) spatial reordering module employed in an example embodiment of the present invention. Input to the Octword spatial reordering module is provided through a peripheral read data (Periph RD Data) input signal 300 to chipset 120 via USB ports 170, PCI 180 and other communications interfaces 190, shown in FIG. 1. The order of arrival of data to peripheral read data input signal 300 is linear in order and the signal is divided into bits 63 through 0 and bits 127 through 64 which are input to multiplexers 310 and 320. Based upon read address bit 3 signal 330, the order of bits 127 through 0 will be determined. For example, if bits 3 of read address signal 330 is set to one then multiplexer 310 will select bits 127 through bits 64 of peripheral read data signal 300 and transmit them as bits 63 through 0. Further, multiplexer 320 would select bits and 63 through 0 of peripheral read data signal 300 and transmit them as bits 127 through 64. The combined data from multiplexers 310 and 320 would form hardware x86 data (hdarx86Data) signal 340 which would be 128 bits in length and further discussed in reference to FIG. 4.

Figure 4:
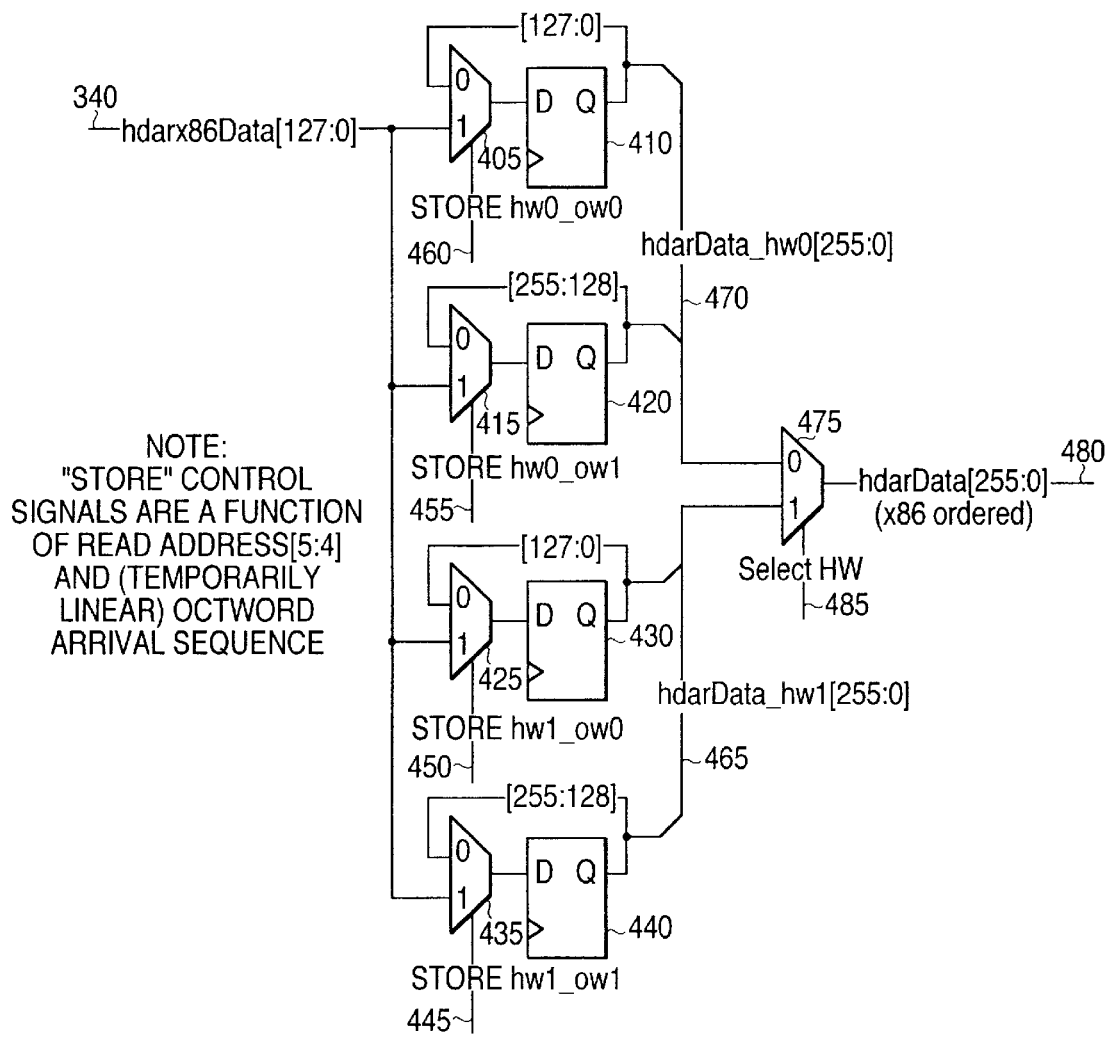
FIG. 4 is a diagram of the peripheral read data path components and logic for ordered buffers continued form FIG. 3 employed in an example embodiment of the present invention.

FIG. 4 is a diagram of the peripheral read data path components and logic for ordered buffers continued from FIG. 3 employed in an example embodiment of the present invention. The input to multiplexers 405, 415, 425, and 435 is from hardware x86 data (hdarx86Data) signal 340 shown in FIG. 3. Which of these multiplexers are selected is based on to bits labeled hw (hexidecimal word) 0 or 1 and ow (octal word) 0 or 1. Hw 0 or 1 and ow 0 or 1 are based upon address bits 5 and 4 shown in table 1 which are processed through further logic not shown. Based upon the values of hw and ow, the order of the data for peripheral read will be determined. For example, if hw is set to zero and ow set to zero then the data as supplied to multiplexers 405 remains unchanged in order and passes to register 410. However, if hw set to zero and ow set to one, then bits 127 through 0 of the hardware x86 data signal 340 will become bits 255 through 128 of hardware data hw0 (hdarData__hw0) signal 470 by using multiplexer 415 which is connected to register 420. Further, if hw is set to 1 and ow is set to 0, then multiplexer 425 will again select to transmit bits 127 through 0 of the hardware x86 data signal 340 as bits 127 through 0 of the hardware data hw 1 (hdarData__hw1) signal 465 via register 430. Further, if both hw and ow are set to one then multiplexer 435 will transmit to register 440 bits 127 through zero as bits 255 through 128 of the hardware data hw 1 (hdarData__hw1) signal 465. Thereafter, combining multiplexer 475 selects either hardware data hw0 signal 470 or hardware data hw1 signal 465, based upon a select hardware (HW) signal 485. Finally, peripheral data signal 480 is output to the processor 110 shown in FIG. 1.

Still referring to FIG. 4, it should be noted that data is arriving in linear order through hardware x86 data signal 340 and temporarily stored in registers 410, 420, 430, and 440 until all required data has arrived. Thus, registers 410, 420, 430, and 440 each would contain 128 bits of data. Thereafter, once all data has arrived it is reordered as discussed above and transmitted to the processor 110. Thus, multiplexers 405, 415 425, and 435 respectively connected to registers 410, 420, 430, and 440 along with combining multiplexer 475 comprise peripheral read data path spatial reordering unit.

Figure 5:
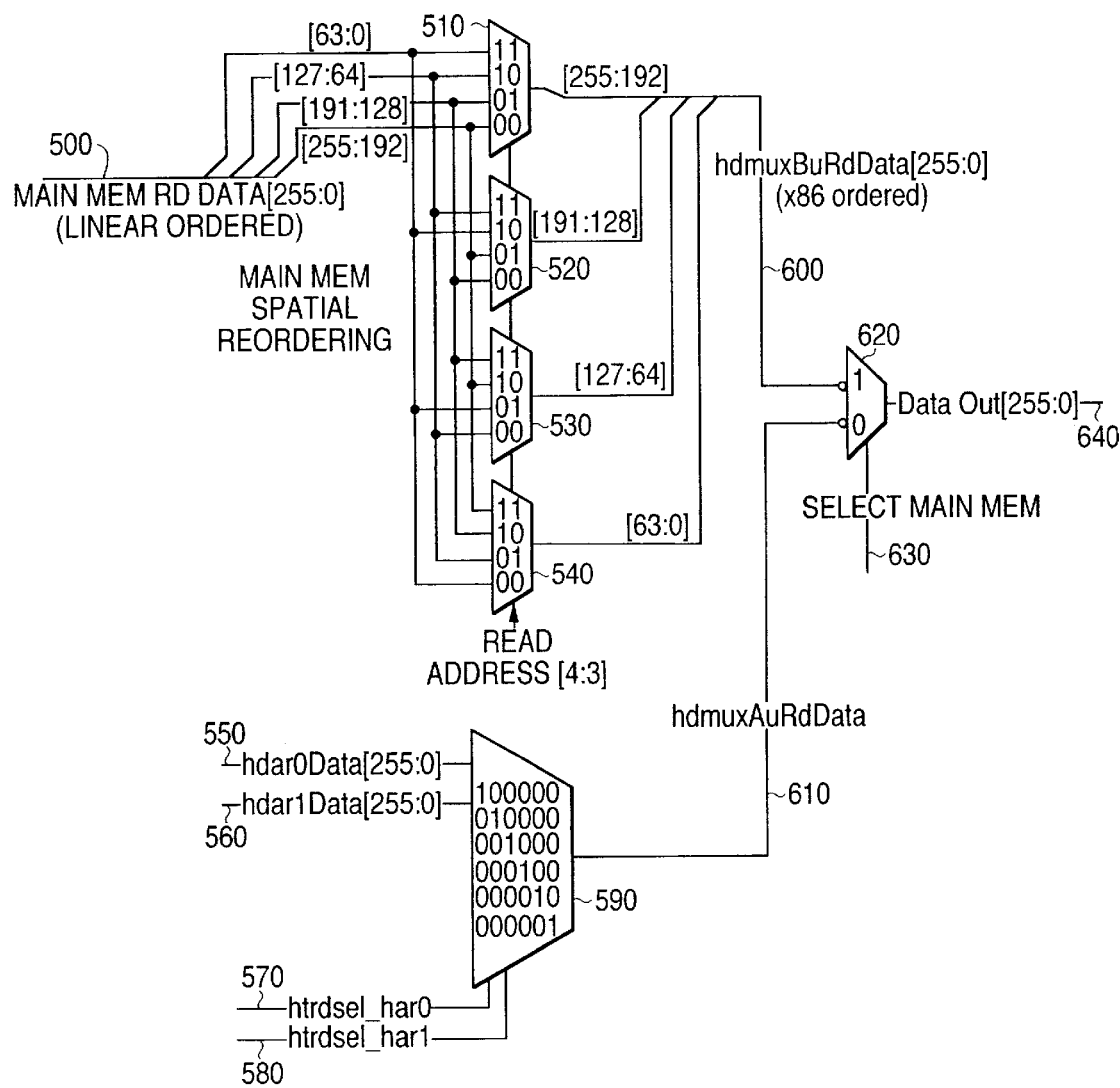
FIG. 5 is a diagram of the read data path components and logic from main memory employed in an example embodiment of the present invention.

FIG. 5 is a diagram of the read data path components and logic from main memory 150, shown in FIG. 1, employed in an example embodiment of the present invention. In the diagram shown in FIG. 5, it should be noted that data becomes from one of two sources. The first source is main memory 150 through main memory read data signal 500. In addition, data may come from the peripheral data signal 480 shown in FIG. 4. However, the example embodiment shown in FIG. 5 and there are two hardware data signals labeled hardware 0 data signal 550 (hdar0Data) and hardware 1 data signal 560 (hdar1Data). This is because the peripheral read data path components shown in FIG. 4 may be duplicated in chipset to 120 to produce the two separate signals shown in FIG. 5.

Still referring to FIG. 5, data from memory would come through main memory read data signal 500 and be divided into four separate 64-bit pieces of data. These four separate 64-bit pieces of data would be transmitted to multiplexers 510, 520, 530, and 540. The spatial ordering of main memory data will be based on the read address bits 4 and 3, as shown in table 1. For example, if the read address bits 4 and 3 were both set to 1 then bits 255 through 192 of main memory read data signal 500 would be placed in bits 63 through 0 using multiplexer 540. Bits 191 through 128 of main memory read data signal 500 would be placed into bits 127 through 64 using multiplexer 530. Further, bits 127 through 64 of main memory read data signal 500 would be placed into bits 191 through 128 using multiplexer 520. Finally, bits 63 through 0 of main memory read data signal 500 would be placed into bits 255 through 192 using multiplexer 510. The output from multiplexer 510 would form 256 bits and form the signal labeled the hardware mux B read data signal 600 which would be transmitted to multiplexer 620. Multiplexer 620, also known as a main memory multiplexer, is controlled by a select main memory signal 630. Thus, the multiplexers 510, 520, 530 and 540 comprise a main memory spatial reordering unit.

Still referring to FIG. 5, multiplexer 590 would receive input from hardware 0 data signal 550 and hardware 1 data signal 560 as well as from other sources not shown. As previously discussed hardware 0 data signal 550 and hardware 1 data signal 560 correspond to peripheral data signal 480 shown in FIG. 4 duplicated twice within chipset to 120, shown in FIG. 1. The selection of either hardware 0 data signal 550 or hardware 1 data signal 560 is based upon hardware select signal 570 and hardware select signal 580 as well as other signals not shown. The output from multiplexer 590 forms the hardware mux A read data signal 610 which is also transmitted to multiplexer 620. Thereafter, depending on the function being performed, the select main memory signal 630 is set to either zero or one to thereby select between hardware mux B read data signal 600 and hardware mux A read data signal 610. The select main memory signal 630 issues to select between between hardware mux B read data signal 600 and hardware mux A read data signal 610. The output from multiplexer 620 is the data out signal 640 which is transmitted to processor 110, shown in FIG. 1.

Using the embodiments of the present invention discussed above, it is possible to spatially and temporarily reorder data for most read and write operations between processor 110, main memory 150 and other peripheral devices. This device is able to accomplish this temporal and spatial ordering while maximizing throughput and minimizing the logic space required on chipset 120.

While we have shown and described only a few example embodiments herein, it is understood that numerous changes and modifications as known to those skilled in the art could be made in the system data chip. Therefore, we do not wish to be limited to the details shown and described herein, but intend to cover all such changes and modifications as are encompassed by the scope of the appended claims.

We claim:

1. A device for reordering data transmitted to a peripheral device, comprising:
   a peripheral write path spatial reordering unit, comprising:
      a plurality of multiplexers to receive sequential data divided into a predetermined number of bits and reorder the data based on a plurality of write address bits; and
   a peripheral write temporal reordering unit, comprising:
      a first multiplexer to receive the recorded from the peripheral write path spatial reordering unit;
      a chunk reorder register to store temporarily the reordered data; and
      a second multiplexer to select between transmitting data stored in the chunk reorder register or directly from the peripheral write path spatial reordering unit.

2. The device as recited in claim 1, wherein the plurality of multiplexers in peripheral write path spatial reordering unit, further comprises:
   a first multiplexer receiving 256 bits of data and selecting 64 bits for transmission based upon the plurality of write address bits;
   a second multiplexer receiving 256 bits of data and selecting 64 bits for transmission based upon the plurality of write address bits;
   a third multiplexer receiving 256 bits of data and selecting 64 bits for transmission based upon the plurality of write address bits; and
   a fourth multiplexer receiving 256 bits of data and selecting 64 bits for transmission based upon the plurality of write address bits.

3. The device as recited in claim 2, wherein the plurality of write address bits comprises two bits.

4. The device as recited in claim 3, wherein the first multiplexer of the peripheral write temporal reordering unit will transmit the 256 bits received from the peripheral write path spatial reordering unit to the chunk reorder register when a store signal is activated.

5. The device as recited in claim 4, wherein the second multiplexer of the peripheral write temporal reordering unit will transmit the 256 bits received from the peripheral write path spatial reordering unit to the peripheral when a bypass signal is activated.

6. The device as recited in claim 5, wherein the second multiplexer of the peripheral write temporal reordering unit will retrieve the 256 bits stored in the chunk recorder register when the bypass signal is not activated.

* * * * *